UNITED STATES PATENT OFFICE.

CLARENCE C. VOGT, OF PITTSBURGH, PENNSYLVANIA, ASSIGNOR TO LEE S. SMITH & SON MANUFACTURING COMPANY, A CORPORATION OF PENNSYLVANIA.

TEMPORARY DENTAL CEMENT OR STOPPING.

1,326,552.   Specification of Letters Patent.   Patented Dec. 30, 1919.

No Drawing.   Application filed July 17, 1919.   Serial No. 311,577.

*To all whom it may concern:*

Be it known that I, CLARENCE C. VOGT, a citizen of the United States, and a resident of Pittsburgh, in the county of Allegheny and State of Pennsylvania, have made a new and useful Invention in Temporary Dental Cement or Stopping, of which the following is a specification.

This invention relates to dentistry and more particularly to improvements in temporary cement capable also of being used as a temporary stopping.

Objects of this invention are to provide a material such as above set forth which is hydraulic, which will set quickly, is impervious, may be easily removed, is strong enough to withstand the strains encountered during mastication, is non-irritant and medicative, is easily inserted without the use of heat, is adhesive and which may be readily manipulated. This object I attain in the material hereinafter described in the specification.

In preparing my material I use by volume about two-thirds zinc oxid and one-third liquid made up of substantially fifty per cent. of natural gum such as rosin and fifty per cent. of essential oil such as oil of cloves. In the preparation of this liquid I preferably melt the rosin and then cut in the oil of cloves. The liquid content of the material and the zinc oxid content are kept separate until the material is to be used, as it sets after mixing in from two to five minutes. For some purposes chloroform may be used instead of an essential oil in making up the liquid and for some purposes oil of wintergreen may be substituted for oil of cloves. Oil of cloves, however, is considered preferable.

It may be desirable for some purposes to add to the natural gum a certain percentage of metallic resinates such as aluminum, zinc or cobalt resinates and when this is done about ten per cent. of metallic resinates may be added to the natural gum. In order to control the setting it is desirable to add a slight percentage of magnesium oxid to the zinc oxid content and the amount to be added, which in some cases may be five or six per cent., will be governed according to the rapidity of setting desired as is now common in those temporary dental cements using zinc oxid as a base.

I am aware that zinc oxid and oil of cloves have been used before but so far as I know a combination of my ingredients is new and novel.

Having thus described my invention what I claim is—

1. A temporary dental cement or stopping consisting of zinc oxid, natural gum and a solvent for such gum.

2. A temporary dental cement or stopping consisting of zinc oxid, rosin and a solvent for rosin.

3. A temporary dental cement or stopping consisting of zinc oxid, natural gum and oil of cloves.

4. A temporary dental cement or stopping consisting of a zinc oxid base and a liquid adapted to react therewith to form zinc resinate and being impervious and adhesive.

5. A temporary dental cement consisting of approximately two-thirds zinc oxid, one-third a natural gum and a solvent therefor in liquid form.

6. The combination for use as a temporary dental cement, of zinc oxid and a liquid adapted to react therewith to form zinc resinate and consisting of a natural gum and a solvent therefor.

7. The combination for use as a temporary dental cement, of zinc oxid and a liquid consisting of rosin and oil of cloves.

8. The combination for use as a temporary dental cement, of strongly basic metallic oxid and a liquid adapted to react therewith to form metallic resinate and consisting of rosin, metallic resinates and oil of cloves.

9. The combination for use as a temporary dental cement, of a reactive metallic oxid and a liquid containing dissolved resin and adapted to react with said oxid to form metallic resinate.

10. The combination for use as a temporary dental cement, of zinc oxid and a liquid consisting of rosin, metallic resinates and oil of cloves.

In testimony whereof, I have hereunto subscribed my name this 14th day of July, 1919.

CLARENCE C. VOGT.